July 1, 1958        S. S. SOREM        2,841,244
PROCESS OF LUBRICATING ENGINES WITH VAPOROUS LUBRICANTS
Filed Oct. 18, 1954
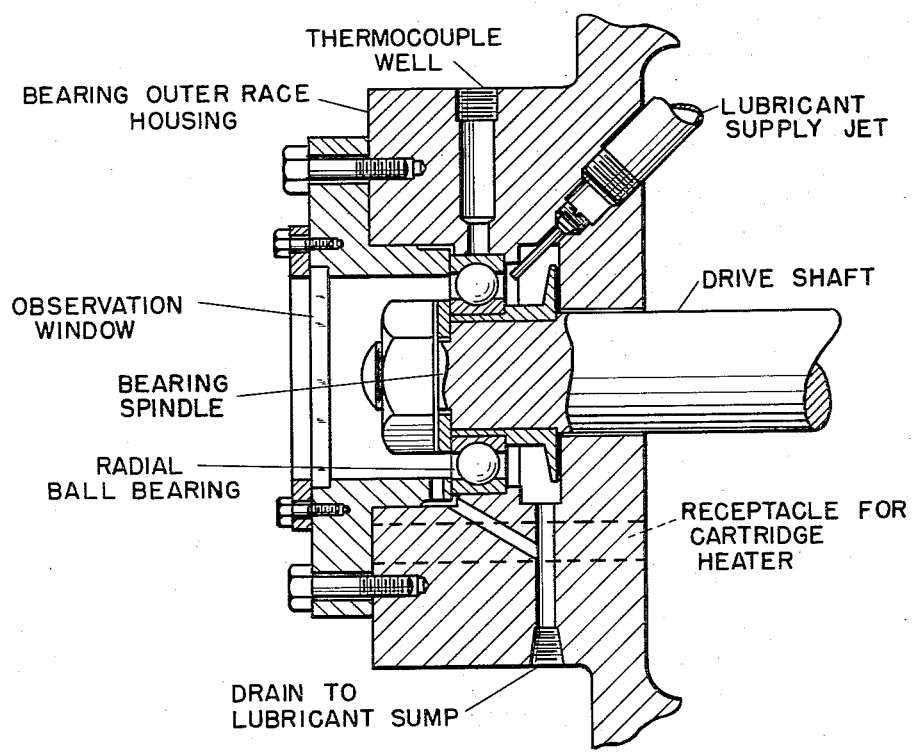
INVENTOR:
STANLEY S. SOREM
BY:    Meurse M. Pritzker
HIS AGENT

United States Patent Office 2,841,244
Patented July 1, 1958

2,841,244

PROCESS OF LUBRICATING ENGINES WITH VAPOROUS LUBRICANTS

Stanley S. Sorem, Orinda, Calif., assignor to Shell Development Company, New York, N. Y., a corporation of Delaware Application October 18, 1954, Serial No. 462,830

14 Claims. (Cl. 184—1)

This invention relates to a method of lubricating relatively moving solid surfaces at high temperatures. It pertains particularly to the high temperature lubrication of bearing surfaces in aircraft gas turbine engines and the like.

It is well recognized that lubrication of solid bearings operating at high temperatures presents problems due to excessive oxidation, corrosivity, volatilization, and the like, of the lubricant, which problems are either not serious or do not occur at all when bearing are operating under other, more usual conditions of use.

Heretofore, efforts have been directed to providing liquid lubricants with better physical characteristics as well as improved chemical stability for the lubrication of solid surfaces such as metal bearings at higher temperatures. However, no entirely satisfactory lubricant has been developed which provides effective protection of the bearing surfaces at temperatures encountered in aircraft gas turbine engines, or of other relatively moving solid surfaces which are operating at or subjected to very high temperatures.

It has now been found that unexpectedly superior lubrication can be provided at high temperatures by contacting the surfaces to be lubricated with a vaporous mixture comprising a substantial or major proportion of air or another free-oxygen containing gaseous material, and a lesser amount of a vaporized non-carbon-forming hydrocarbon lubricating liquid, the amount of air or like free-oxygen-containing gaseous material being insufficient to effect complete combustion of the organic material.

Described more particularly, it has been found that improved lubrication at the high operating temperature can be obtained by surrounding or blanketing the surfaces to be lubricated with a mixture of one or more vaporized relatively volatile non-carbon-forming hydrocarbon lubricating liquids (preferably hydrocarbons having an end boiling point not over about 450° F.) which liquids do not form carbonaceous deposits at operating elevated temperatures, and air in a weight ratio of air-to-hydrocarbon of from about 7:1 to about 10:1.

Below the ratio of 7:1 carbon formation of the air-hydrocarbon mixture at high temperatures has been found to occur excessively, while above the ratio of 10:1 there are tendencies of the mixture to cause oxidation of bearings which oxidation products in turn form abrasives at high temperatures. This ratio relates to the general class of liquid hydrocarbons having an end point of not over about 450° F., which hydrocarbons are suitable to form the lubricant mixture of this invention, but the ratio can be varied depending upon the carbon tendencies of the liquid lubricant used and the oxidation tendencies of the bearing metal.

Instead of air, other free-oxygen-containing gaseous materials can be used, such as other mixtures of free oxygen and nitrogen, as well as oxygen per se. In such a case the ratio of the oxygen to hydrocarbon should be adjusted accordingly so that the ratio of free oxygen to hydrocarbon is equivalent to that of the free oxygen to hydrocarbon in the air-hydrocarbon mixtures specified above. Thus, expressed in terms of free oxygen, the weight ratio of oxygen to hydrocarbon is from about 7:5 to about 2:1, respectively.

In accordance with a more restricted and preferred aspect of the invention, the lubrication of metallic surfaces with the vaporous mixture at high temperatures is still further improved by providing the bearing surfaces with a compound capable of coating or reacting with said surfaces and containing at least one other element which exhibits acidic chemical properties, particularly the chemically acidic elements of groups V to VII of the periodic table. Those elements which are particularly effective for this purpose are phosphorous, sulfur, selenium and tellurium, occurring in the right hand side of groups V and VI. The surface compound can be provided in a separate and distinct operation, as by a pretreatment with a suitable active agent of the acidic element, and/or in the same operation of lubrication as by incorporating the agent in the vaporous lubricating mixture.

The surface compounds appear to serve at least two functions, both advantageous to the effective lubrication. They provide a load carrying film, such as a metal phosphide or phosphate or a metal sulfide, and they are effective in minimizing the undesirable production of carbonaceous deposits, presumably in part by shielding the lubricating vaporous mixture at the elevated temperature from the catalytic activity of the metal of the bearing.

When the surfaces to be lubricated are chemically pretreated, they can be so treated by various methods which are well known in the art.

The chemically reactive agents capable of forming protective films on the contacting metallic surfaces can be normally gaseous, liquid or solid and they may be utilized in the gaseous, liquid or solid state. Materials which are readily utilized in the gaseous state include fumes of sulfur, hydrogen sulfide, carbon disulfide, chlorine, etc. The sulfide or chloride film can be formed on the surface to be protected by simply contacting the gas with the hot metal surface to be protected. In cases where reagents are used in the liquid state the metal surface can be dipped in, sprayed with, or painted with an aqueous or non-aqueous composition containing the reactive agent. Illustrative compositions are aqueous solutions of hydrogen sulfide, ammonium sulfide, ammonium polysulfide, sodium polyselenide, etc. The composition can be a colloidal aqueous, or oil suspension of sulfur, sulfurized oils, such as sulfurized lard oil, or mineral oil containing sulfurized lard oil and/or sulfur, dialkyl selenides, e. g., dilauryl selenide, and the like. Phosphate films can be formed on the metal surface by treating the metal surface with an aqueous solution containing phosphoric acid or a phosphate salt, e. g., tribasic sodium phosphate, or mixtures thereof. The metal surface can also be dusted with a solid agent, such as sulfur flowers and thereafter heated so as to form a sulfide film on the metal surface. Other methods of pretreating the surface desired to be lubricated include the heating of the metal in a mineral lubricating oil containing: (a) an organic acid phosphate or phosphite, such as an aryl or alkyl acid phosphate, e. g., triethylphosphate, diphenyl phosphoric acid, dilauryl phosphoric acid, or an alkyl phosphite, such as tributyl phosphite, and/or (b) a halogenated hydrocarbon or halogenated organic compound, such as a chlorinated olefin, trichlorophosphonates, $CCl_4$, fluorinated olefins, trifluoracetic acid and mixtures thereof, a chlorinated aryl compound such as a chlorinated naphthalene, a chlorinated anthracene, a chlorinated alkylbenzene, dichlorodibenzyl disulfide, pentachlorophenol, etc. Still other methods of forming anti-scuffing, anti-seizing and wear resistant films on surfaces to be lubricated is described in "Metal Coloring" by Hiorns, McMillan Company of London. A preferred method of forming protective films is to run the assembled machine at a temperature of about 400° F. while lubricating with a lubricant containing the desired pretreating additive such as sulfurized mineral oil containing about 1% sulfur.

An effective way of introducing a surface treating compound or anti-scuffing agent into the lubricating system of an engine is to use a sulfur-containing fuel such as one containing from 0.1% to about 1% sulfur also as the lubricant or using it as a portion of the base lubricant.

The vaporous lubricant used to lubricate the metal surface comprises a mixture of free oxygen, which can be supplied in admixture with an inert gas such as nitrogen as in air, and a light liquid essentially hydrocarbonaceous organic substance, or mixture or substances having an end boiling point below the operating temperature of the bearing surface and which at the operating temperature does not tend to form carbonaceous or abrasive deposits. The organic substance is preferably a normally liquid hydrocarbon, generally a mixture of hydrocarbons, having an end boiling point below about 450° F. The ratio of oxygen to organic material in the vaporous lubricant mixture is critical for the present purpose. Thus, when the proportion of such gases is too small the deposition of carbon on the bearing results in failure, and similarly when the proportion of such gases is too large oxidation of the bearing surfaces and consequent failure occurs. It has been found that the proportion of oxygen can be controlled to provide sufficient oxidation of the organic material and avoid pyrolysis to free carbon or to highly carbonaceous residues and at the same time avoid substantial oxidation to carbon dioxide, the oxidation product of the carbon being largely carbon monoxide, thereby providing an effective reducing atmosphere and minimizing oxidative attack on the metal bearing surfaces.

The readily vaporizable organic portion of the lubricant can be suitable hydrocarbons and mixtures thereof of the paraffinic and/or naphthenic type. They are readily prepared from petroleum fractions by suitably refining to remove excessive amounts of aromatics, but they may contain the naturally occurring sulfur compounds such as the thiophenes, sulfides, oxygen-containing compounds and the like. Such materials include light hydrogen fractions, naphthas, kerosene, etc. which may contain modifiers such as alkyl nitrites, or nitrates, alkyl sulfide and other compounds, e. g., amyl nitrite or amyl nitrate, ethyl disulfide, chloropicrin, and other additives which are often characteristic of these products.

In the operation of jet aircraft vaporizable products which are particularly suitable for admixture with air or the like for the intended purpose of this invention include hydrocarbon mixtures meeting specifications requirements for JP-3 or JP-4 fuels, either of which may contain from 0.1% to 0.4% sulfur. A particularly suitable JP-4 fuel had the characteristics and properties given in Table I.

*Table I*

Distillation, °F.:
    10% evaporated _____ 208
    90% evaporated _____ 406
    End point _____ 424
Gravity, °API _____ 45–55
Sulfur, percent _____(max.)__ 0.4
Reid vapor pressure, p. s. i_____ 2–3
Freezing point _____(max.)__ —76° F.
Aromatics, percent v_____(max.)__ 25

Other products which are suitable for forming the air-hydrocarbon lubricant blend include fractions from standard aircraft gas turbine lubricating oils 1005 and 1010 and mixtures thereof, which fractions have an end point below 450° F.

The lubricants can be derived from natural hydrocarbons or produced synthetically such as by polymerization of olefins and the like. These products can also contain conventional anti-oxidants such as p-N-butyl-aminophenol, N,N' - di - sec - butyl-p-phenylenediamine, butylated 4-methoxy phenol, 2,6-di-tert-butyl-p-cresol, 2,2'-methylene-bis(6-tert-butyl-p-cresol); dispersants of the polymer ester type, oiliness agents of the fatty acid type, e. g., oleic and stearic acids; mild-extreme pressure agents of the sulfur-phosphorus type and the like.

The surface treating compounds of anti-scuffing agents, which are capable of forming protective films on the surfaces to be lubricated can be introduced into the air (oxygen)-vaporous lubricant blend in amounts of from 0.01% to 5% and preferably from 0.1% to 1% so that the protective film can be formed in situ. The air-lubricant blend, with or without the anti-scuffing forming agents, can be sprayed or atomized onto the surface to be lubricated such as gears and bearings so that the entire surface is enveloped or blanketed in a vaporous lubricant. Also, the lubricant may be vaporized into the air stream at any convenient location and the mixture conducted to the surface to be lubricated.

The air-liquid lubricant can be used as a conventional mist lubricant during the periods of operation when machine parts are at temperatures below the end boiling point of the lubricant.

In order to demonstrate the effectiveness of lubricating equipment operating at elevated temperatures, the apparatus as noted in the drawing was designed to simulate test conditions encountered in aircraft gas turbine engines while in operation. This apparatus comprises a bearing mounted on a spindle the speed of which is controlled and in a housing the temperature of which is maintained at any desired level by means of electric heaters and controlled by a thermocouple and suitable controlled current. The lubricant to be tested is injected into the system by means of a lubricating supply jet.

The test was conducted in the following manner: The spindle was rotated at 10,000 R. P. M. and the bearing broken in for about 20 minutes at ambient temperature. A liquid lubricant which can be used during the break-in period can be a conventional aircraft gas turbine engine oil. After the break-in period, the test lubricant was injected and heat was then applied and the temperature increased at the rate of about 5° F. per minute until 600° F. was reached. Operation was continued at 600° F. until bearing failure occurred.

The results of the tests are tabulated in Table II.

*Table II.—Test results*

| Composition [1] | Time of Bearing Failure |
|---|---|
| 1. Dry_____ | 1 min. |
| 2. Air–1005 Aircraft Gas Turbine Lubricant in 7:1 ratio, respectively. | 4–5 hours, failed due to carbon deposits. |
| 3. Air–1010 Aircraft Gas Turbine Lubricant in 7:1 ratio, respectively. | Do. |
| 4. Air–JP–4 Aircraft Turbine and Jet Engine Fuel in 32:1 ratio, respectively. | 3 hours, failed due to abrasion. |
| 5. Air–JP–4 Aircraft Turbine and Jet Engine Fuel in 30:1 ratio, respectively, and in presence of $CS_2$. | Do. |
| 6. Air–Aircraft Gas Turbine Lubricant in 4:1 ratio, respectively. | 5–6 hours, failed due to carbon deposits. |
| 7. Air–JP–4[2] Aircraft Turbine and Jet Engine Fuel in 4:1 ratio, respectively. | Do. |
| 8. Air–JP–4[2] Aircraft Turbine and Jet Engine Fuel in 14:1 ratio, respectively. | 5–6 hours, failed due to abrasion. |
| 9. Composition 7 containing 1.25% triethyl phosphate. | 5–6 hours, failed due to carbon deposit. |
| 10. Composition 8 containing 1.25% triethyl phosphate. | 5–6 hours, failed due to abrasion. |
| 11. Air–JP–4[2] Aircraft Turbine and Jet Engine Fuel in 7:1 ratio, respectively. | 10 hours, bearings in good condition, test stopped. |
| 12. Air–JP–4[2] Aircraft Turbine and Jet Engine Fuel in 10:1 ratio, respectively | Do. |
| 13. Air–JP–4[2] Aircraft Turbine and Jet Engine Fuel in 7:1 ratio, respectively, used in conjunction with a sulfide precoated bearing. | 80 hours, bearings in excellent condition. |
| 14. Air–JP–4[2] Aircraft Turbine and Jet Engine Fuel in 7:1 ratio, respectively, used in conjunction with a phosphate precoated bearing. | 85 hours, bearings in excellent condition. |

[1] At test temperature the lubricants 4–14 were in vaporous state.
[2] See Table III.

*Table III.—Properties of JP–4 fuel used*

| | |
|---|---:|
| Gravity, °API | 46.2 |
| Color | 0 |
| RVP, lb. at 100° F | 2.5 |
| Doctor test | Neg. |
| Corrosion, Cu strip (air well) | pass |
| Water tolerance | immiscible |
| Sulfur, percent wt | 0.20 |
| Freezing point, °F | −80 |
| Residue, mg./100 ml. (Air Jet at 400° F.) | 4 |
| Gum, mg./100 ml. (accel. 16 hr.) | 12 |
| Aromatics, percent vol | 11.5 |
| Bromine No | 2.8 |
| Heat of combustion, B. t. u./lb. net | 18,550 |
| Inhibitor, lb./1,000 bbl | 2.1 |
| Mercaptan sulfur, percent weight | 0.0003 |
| ASTM distillation, °F.: | |
|     IBP | 132 |
|     FBP | 474 |
|         10% evap., °F | 240 |
|         50% evap., °F | 374 |
|         90% evap., °F | 432 |
|     Percent rec | 98.0 |
|     Percent res | 1.0 |
|     Percent loss | 1.0 |

Lubricants of this invention are particularly applicable for ball and roller bearings of gas turbine engines where operating temperatures are high and can also be used for lubrication of various other machines and equipment operating at high temperatures and speeds. Lubricating by the method of this invention can be modified to meet other high temperature requirements and can be applied to any mechanism operating at high temperatures, speeds and loads such as conveyor belts, furnace belts and the like.

This patent application is a continuation-in-part of our case Serial No. 442,767, filed July 12, 1954, and now abandoned.

I claim as my invention:

1. A process of lubricating solid surfaces subjected to temperatures in excess of 450° F., high loads, scuffing and seizing conditions which comprises preforming on said surfaces protective films thereon selected from the group consisting of sulfides, selenides, tellurides, phosphates and halides and thereafter contacting said surfaces with a vaporous lubricant comprising a blend of a free-oxygen-containing gaseous material and a hydrocarbon liquid lubricant having an end boiling point below 450° F., said blend being in the weight ratio of oxygen to liquid lubricant from about 7:5 to about 2:1, respectively.

2. A process of lubricating vehicle components operating at temperatures in excess of 450° F. which comprises preforming on parts requiring lubrication a sulfide film thereon and thereafter under operating conditions contacting said parts with a vaporous lubricant comprising a blend of air and a hydrocarbon having an end boiling point below 450° F. in the weight ratio of from about 7:1 to about 10:1, respectively.

3. A process of lubricating vehicle components operating at temperatures in excess of 450° F. which comprises preforming on parts requiring lubrication a halide film thereon and thereafter under operating conditions contacting said parts with a vaporous lubricant comprising a blend of air and a hydrocarbon having an end boiling point below 450° F. in the weight ratio of from about 7:1 to about 10:1, respectively.

4. A process of lubricating vehicle components operating at temperatures in excess of 450° F. which comprises preforming on the parts requiring lubrication a phosphate film thereon and thereafter under operating conditions contacting said parts with a vaporous lubricant comprising a blend of air and a hydrocarbon having an end boiling point below 450° F. in the weight ratio of from about 7:1 to about 10:1, respectively.

5. A process of lubricating solid surfaces subjected to temperatures in excess of 450° F. and subject to high loads, scuffing and seizing conditions which comprises contacting said surfaces with a blend comprising a free-oxygen-containing gaseous material and a hydrocarbon liquid lubricant having an end boiling point below 450° F., said blend being in the weight ratio of oxygen to liquid lubricant of from about 7:5 to about 2:1, respectively, said blend containing from 0.01 to 5% of a chemically reactive compound capable of forming a protective film on the surfaces being lubricated selected from the group consisting of sulfides, selenides, tellurides, phosphates and halides.

6. A process of lubricating vehicle components operating at temperatures in excess of 450° F. which comprises blanketing the parts requiring lubrication with a blend of air and a hydrocarbon oil having an end boiling point below 450° F. in the weight ratio of from about 7:1 to about 10:1, respectively, said blend containing from 0.01 to 5% of a sulfide forming compound based on percent of hydrogen.

7. A process of lubricating vehicle components operating at temperatures in excess of 450° F. which comprises blanketing the parts requiring lubrication with a blend of air and a light hydrocarbon oil having an end boiling point below 450° F. in the weight ratio of from about 7:1 to about 10:1, respectively, said blend containing from 0.01 to 5% of a halide forming compound.

8. A process of lubricating vehicle components operating at temperatures in excess of 450° F. which comprises blanketing the parts requiring lubrication with a blend of air and a hydrocarbon oil having an end boiling point below 450° F. in the weight ratio of from about 7:1 to about 10:1, respectively, said blend containing from 0.01 to 5% of a phosphate forming compound.

9. A process of lubricating engines operating at temperatures in excess of 450° F. which comprises blanketing the parts requiring lubrication with a blend of air and a light hydrocarbon oil having an end boiling point below 450° F. in the weight ratio of from about 7:1 to about 10:1, respectively, containing 0.1% to 0.4% sulfur.

10. A process of lubricating engines operating at temperatures in excess of 450° F. which comprises blanketing the parts requiring lubrication with a blend of air and a light hydrocarbon oil having an end boiling point approximately not about 450° F. in the weight ratio of about 7:1 and containing from 0.01% to 5% of sulfur.

11. A process of lubricating engines operating at temperatures in excess of 450° F. which comprises blanketing the parts requiring lubrication with a blend of air and a light hydrocarbon oil having an end boiling point approximately not above 450° F. in the weight ratio of about 7:1 and containing from 0.01% to 5% of triethyl phosphate.

12. A process of lubricating engines operating at temperatures in excess of 450° F. which comprises blanketing the parts requiring lubrication with a blend of air and a light hydrocarbon oil having an end boiling point approximately not above 450° F. in the weight ratio of about 7:1 and containing from 0.01% to 5% carbon disulfide.

13. A process of lubricating engines operating at temperatures in excess of 450° F. which comprises blanketing the parts requiring lubrication with a blend of air and a light hydrocarbon oil having an end boiling point approximately not above 450° F. in the weight ratio of about 7:1 and containing from 0.01% to 5% carbon tetrachloride.

14. A process of lubricating coated solid surfaces subjected to temperatures in excess of 450° F., said coating being selected from the group consisting of sulfide, selenide, telluride, phosphate and halide films with a lubricant comprising blanketing the surface to be lubricated with a free oxygen containing gaseous material and a hydrocarbon liquid lubricant having a boiling point below 450° F., said blend being in the weight ratio of oxygen to the lubricant of from about 7:5 to about 1:2, respectively.

References Cited in the file of this patent

UNITED STATES PATENTS

| | | |
|---|---|---|
| 2,367,721 | Gothberg | Jan. 23, 1945 |
| 2,531,411 | Davenport | Nov. 28, 1950 |
| 2,664,173 | Karig | Dec. 29, 1953 |

FOREIGN PATENTS

| | | |
|---|---|---|
| 555,519 | Great Britain | Aug. 26, 1943 |
| 704,761 | Great Britain | Mar. 3, 1954 |
| 706,795 | Great Britain | Apr. 7, 1954 |